(12) United States Patent
Yang

(10) Patent No.: US 9,720,588 B2
(45) Date of Patent: Aug. 1, 2017

(54) MOBILE TERMINAL AND APPLICATION-CONTROLLING METHOD THEREOF

(71) Applicant: HUIZHOU TCL MOBILE COMMUNICATION CO., LTD, Huizhou, Guangdong (CN)

(72) Inventor: Zhibing Yang, Guangdong (CN)

(73) Assignee: Huizhou TCL Mobile Communication Co., Ltd, Huizhou, Guangdong (CN)

( * ) Notice: Subject to any disclaimer, the term of this patent is extended or adjusted under 35 U.S.C. 154(b) by 16 days.

(21) Appl. No.: 14/403,341

(22) PCT Filed: Jul. 26, 2013

(86) PCT No.: PCT/CN2013/080166
§ 371 (c)(1),
(2) Date: Nov. 24, 2014

(87) PCT Pub. No.: WO2014/121589
PCT Pub. Date: Aug. 14, 2014

(65) Prior Publication Data
US 2015/0099563 A1 Apr. 9, 2015

(30) Foreign Application Priority Data
Feb. 5, 2013 (CN) .......................... 2013 1 0047047

(51) Int. Cl.
*G06F 3/041* (2006.01)
*G06F 3/045* (2006.01)
(Continued)

(52) U.S. Cl.
CPC ........ *G06F 3/0488* (2013.01); *G06F 3/04883* (2013.01); *H04M 1/72583* (2013.01)

(58) Field of Classification Search
None
See application file for complete search history.

(56) References Cited

U.S. PATENT DOCUMENTS

2008/0087477 A1* 4/2008 Cho ...................... G06F 3/0416
178/18.01
2009/0320142 A1* 12/2009 Takahashi ............... G06F 21/10
726/28
(Continued)

FOREIGN PATENT DOCUMENTS

CN 102023772 A 4/2011
CN 102736759 A 10/2012
(Continued)

OTHER PUBLICATIONS

Lawrence D. Cutler et al: "Two-handed direct manipulation on the responsive workbench", Proceedings of 1997 Symposium on Interactive 3 D Grapgics Apr. 27-30, 1997 providence, ri, USA, Jan. 1, 1997 (Jan. 1, 1997), p. 107-ff., XP055297147.
(Continued)

*Primary Examiner* — Moustapha Diaby
(74) *Attorney, Agent, or Firm* — Klein, O'Neill & Singh, LLP

(57) ABSTRACT

A mobile terminal and an application-controlling method thereof are provided. The application-controlling method for the mobile terminal according to the present disclosure comprises: detecting an action on a touch screen of the mobile terminal when an application is running; if the action is a static action, then acquiring a touch area between the static action and the touch screen; and comparing the touch area with a threshold area, and if the touch area is no less than the threshold area, then stopping running of the application. In this way, the mobile terminal and an application-controlling method thereof according to the present disclosure can make it more convenient for the user to operate the applications of the mobile terminal and are easy to operate and to be popularized.

5 Claims, 2 Drawing Sheets

(51) Int. Cl.
H04B 1/38 (2015.01)
H04M 1/00 (2006.01)
G06F 3/0488 (2013.01)
H04M 1/725 (2006.01)

(56) References Cited

U.S. PATENT DOCUMENTS

| | | | |
|---|---|---|---|
| 2010/0173679 A1* | 7/2010 | Moon | H04M 1/67 |
| | | | 455/566 |
| 2010/0214322 A1* | 8/2010 | Lim | G06F 3/042 |
| | | | 345/661 |
| 2010/0219943 A1* | 9/2010 | Vanska | G06F 1/163 |
| | | | 340/407.1 |
| 2012/0162111 A1 | 6/2012 | Lee et al. | |
| 2013/0002579 A1* | 1/2013 | Hatano | G06F 3/0418 |
| | | | 345/173 |
| 2013/0053107 A1* | 2/2013 | Kang | G06F 3/04883 |
| | | | 455/566 |

FOREIGN PATENT DOCUMENTS

| | | |
|---|---|---|
| CN | 103106035 A | 5/2013 |
| CN | 103152484 A | 6/2013 |
| CN | 103259923 A | 8/2013 |

OTHER PUBLICATIONS

V.I. Pavlovic et al: "Visual interpretation of hand gestures for human-computer interaction: a review", IEEE Transactions on Pattern Analysis and Machine Intelligence, vol. 19, No. 7, Jul 1, 1997 (Jul. 1, 1997), p. 677-695.

* cited by examiner

MOBILE TERMINAL AND APPLICATION-CONTROLLING METHOD THEREOF

RELATED APPLICATIONS

This application is a national phase entry under 35 USC 371 of International Patent Application No. PCT/CN2013/080166 filed on 26 Jul. 2013, which was published on 14 Aug. 2014 with International Publication Number WO2014/121589 A1, which claims priority from Chinese Patent Application No. 201310047047.9 filed on 5 Feb. 2013, the disclosures of which are incorporated in their entirety by reference herein.

FIELD OF THE INVENTION

The present disclosure generally relates to the technical field of mobile terminals, and more particularly, to a mobile terminal and an application-controlling method thereof.

BACKGROUND OF THE INVENTION

Nowadays, mobile terminals are used not merely as a kind of communication apparatuses, but are provided with increasingly more powerful multimedia functions owing to the development of science and technologies. Therefore, users are paying more attention to other functions besides the communication function when they choose to purchase mobile terminals. Accordingly, a mobile phone needs to be provided not only with a good communication function, but also with a powerful multimedia processing capability, particularly for video files and audio files.

For example, when a user who is enjoying music on a conventional mobile terminal needs to stop the music playing, he or she must firstly return to a control interface of the music playing, then manually operate a button or click a touch screen thereof to complete the operation of stopping the music playing. However, if a user who is on a bus or on some other transportation vehicle is in a hurry to get off, the conventional way to stop the music playing is obviously inconvenient for the user. As can be known from this, the conventional mobile terminals are still inconvenient to use in terms of controlling of applications, and the operation procedure thereof is relatively complex.

Accordingly, there is a need to provide a mobile terminal and an application-controlling method thereof that can solve the aforesaid problems.

SUMMARY OF THE INVENTION

A primary technical problem to be solved in the present disclosure is to provide a mobile terminal and an application-controlling method thereof, which can make it more convenient for the user to operate the applications of the mobile terminal and are easy to operate and to be popularized.

To solve the above technical problem, a technical solution adopted in the present disclosure is to provide an application-controlling method of a mobile terminal, which comprises: detecting an action on a touch screen of the mobile terminal when an application is running; if the action is a static action, then acquiring a touch area between the static action and the touch screen, wherein the numbers of sensing channels covered by the static action on an X-axis and a Y-axis of the touch screen respectively are detected, and the touch area of the static action is determined according to the numbers of the sensing channels, and wherein the sensing channels covered by the static action on the X-axis and the Y-axis of the touch screen are consecutive, and the static action is a static covering on the touch screen by a palm or a touch on the touch screen by a face; and comparing the touch area with a threshold area, and if the touch area is no less than the threshold area, then stopping running of the application.

If the action is not a static action, the mobile terminal operates normally according to a controlling instruction generated in response to a point touch.

To solve the above technical problem, another technical solution adopted in the present disclosure is to provide an application-controlling method for a mobile terminal, which comprises: detecting an action on a touch screen of the mobile terminal when an application is running; if the action is a static action, then acquiring a touch area between the static action and the touch screen; and comparing the touch area with a threshold area, and if the touch area is no less than the threshold area, then stopping running of the application.

The static action is a static covering on the touch screen by a palm or a touch on the touch screen by a face.

The step of acquiring a touch area between the static action and the touch screen comprises: detecting the numbers of sensing channels covered by the static action on an X-axis and a Y-axis of the touch screen respectively; and determining the touch area of the static action according to the numbers of the sensing channels.

The sensing channels covered by the static action on the X-axis and the Y-axis of the touch screen are consecutive.

The application comprises music playing, mobile phone calling or website browsing.

If the action is not a static action, the mobile terminal operates normally according to a controlling instruction generated in response to a point touch.

To solve the above technical problem, still another technical solution adopted in the present disclosure is to provide a mobile terminal, which comprises an action-sensing chip, a touch screen and a baseband signal processing chip. The action-sensing chip is coupled with the baseband signal processing chip, the touch screen is coupled with the baseband signal processing chip, and an application runs in the baseband signal processing chip. The action-sensing chip detects an action on the touch screen when the application is running; if the action-sensing chip determines that the action is a static action, then the touch screen acquires a touch area between the static action and the touch screen; and the baseband signal processing chip acquires the touch area from the touch screen, compares the touch area with a threshold area, and if the touch area is no less than the threshold area, then stops running of the application.

The static action is a static covering on the touch screen by a palm or a touch on the touch screen by a face.

The touch screen is provided with a touch screen chip, which is configured to detect the numbers of sensing channels covered by the static action on an X-axis and a Y-axis of the touch screen respectively, and to determine the touch area of the static action according to the numbers of the sensing channels.

The sensing channels covered by the static action on the X-axis and the Y-axis of the touch screen that are detected by the touch screen chip are consecutive.

The application comprises music playing, mobile phone calling or website browsing.

If the action-sensing chip determines that the action is not a static action, the mobile terminal operates normally according to a controlling instruction generated in response to a point touch.

As compared to the prior art, the present disclosure senses a static action of a user on a touch screen of a mobile terminal, acquires a touch area of the static action, and then compares the touch area with the threshold area so as to control the mobile terminal to execute operations on applications such as turning off a music player, closing a web browser, hanging up the phone and etc. The mobile terminal and the application-controlling method thereof according to the present disclosure make it more convenient for the user to operate the applications of the mobile terminal, and are easy to operate and to be popularized.

DETAILED DESCRIPTION OF THE INVENTION

The present disclosure provides an application-controlling method for a mobile terminal, which mainly comprises: detecting an action on a touch screen of the mobile terminal when an application is running; if the action is a static action, acquiring a touch area between the static action and the touch screen; and comparing the touch area with a threshold area, and if the touch area is no less than the threshold area, stopping running of the application.

Hereinbelow, the present disclosure will be detailed with reference to the drawings and embodiments thereof.

Figure 1:
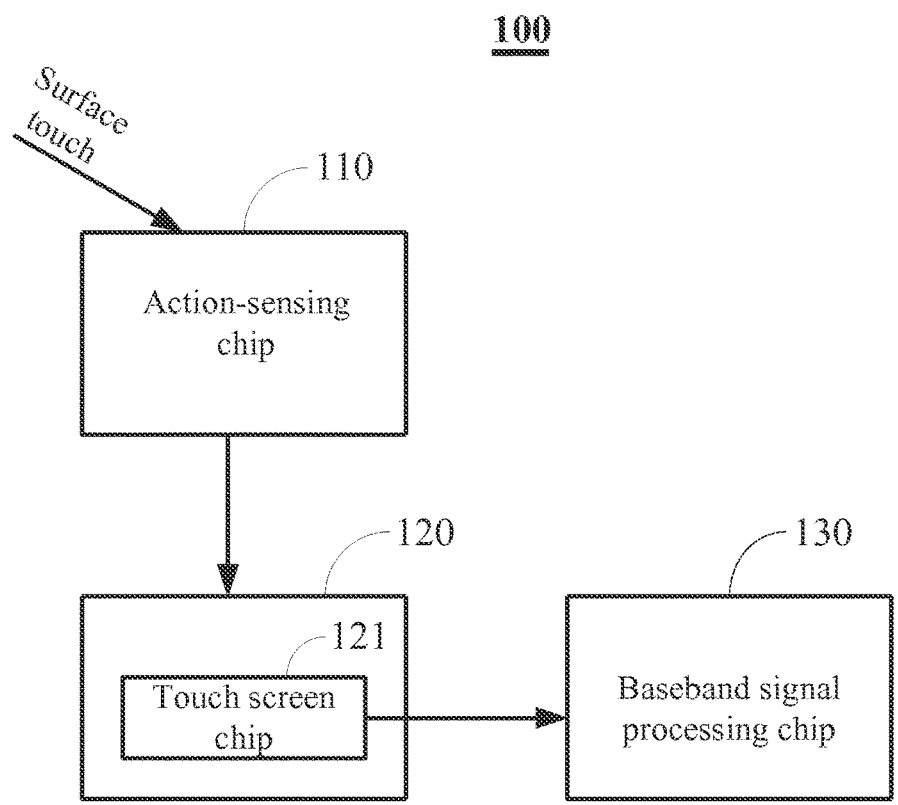
FIG. 1 is a schematic block diagram of a mobile terminal according to an embodiment of the present disclosure.
Figure 2:
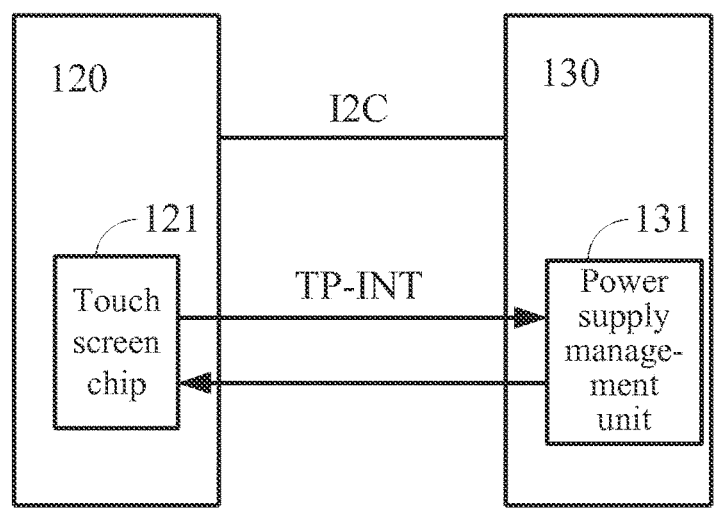
FIG. 2 is a schematic view illustrating hardware connections of the mobile terminal shown in FIG. 1.

FIG. 1 is a schematic block diagram of a mobile terminal according to embodiments of the present disclosure, and FIG. 2 is a schematic view illustrating hardware connections of the mobile terminal as shown in FIG. 1. As shown in FIG. 1 and FIG. 2, the mobile terminal 100 comprises an action-sensing chip 110, a touch screen 120, and a baseband signal processing chip 130. Specifically, the action-sensing chip 110 is coupled with the baseband signal processing chip 130, the touch screen 120 is coupled with the baseband signal processing chip 130, and an application runs in the baseband signal processing chip 130.

In this embodiment, the action-sensing chip 110 detects an action on the touch screen 120 when the application is running, and if the action-sensing chip 110 determines that the action is a static action, a touch screen chip 121 in the touch screen 120 acquires a touch area between the static action and the touch screen 120; the baseband signal processing chip 130 acquires the touch area from the touch screen 120, and compares the touch area with a threshold area; if the touch area is no less than the threshold area, then stops running of the application. In this embodiment, the application comprises music playing, mobile phone calling, website browsing or the like.

In this embodiment, the touch screen 120 is coupled with the baseband signal processing chip 130 via an I2C interface; the touch screen chip 121 is coupled with the baseband signal processing chip 130 via a pin of TP-INT; and the baseband signal processing chip 130 is further provided therein with a power-supply management unit 131, which is configured to provide power to the touch screen chip 121.

It should be noted that, the mobile terminal 100 of this embodiment determines the static action of the user by the action-sensing chip 110. Because the mobile terminals in the prior art generally adopt a capacitive touch screen that uses an axis coordinate system, the principle and the process of the operation of the action-sensing chip 110 in the touch screen 120 will be detailed hereinbelow.

Sensing units in the touch screen 111 are arranged in a matrix comprising a plurality of rows and a plurality of columns, and there are a plurality of sensing channels on an X-axis and a Y-axis of the axis coordinate system respectively. The more the sensing channels are, the higher the sensing accuracy and the action resolution will be. Because four sides of the capacitive touch screen are all plated with long and narrow electrodes (i.e., sensing channels on the X-axis and the Y-axis), a low-voltage alternating current (AC) electric field is formed in the electric conductor. When the user touches the touch screen 111 with a certain action, a coupling capacitor is formed among the electric field of the human body, the hand and the electric conductor, the currents generated from the four electrodes at the four sides flow to the touch point, and the strengths of the currents are proportional to the distances between the hand and the respective electrodes respectively. Then, the action-sensing chip 110 located behind the touch screen 111 determines the touching position accurately by calculating the proportions of the currents to each other and the strengths of the currents, and determines a type of the touch action by determining whether the sensing channels on the X-axis and the Y-axis are consecutive. For example, if it is determined that the sensing channels are inconsecutive, then the touch action is determined to be a point touch, such as pressing down at a certain position, releasing at a certain position, sliding along a direction from a certain position, double-clicking, scaling through a multi-touch of two fingers on the touch screen, rolling and rotating and etc.

If the action-sensing chip 110 determines that the touch action is a static surface touch action, then the touch screen 111 determines the touch area of the static surface touch according to the numbers of the sensing channels on the X-axis and the Y-axis. Then the touch screen chip 121 in the touch screen 111 reports the touch area to the baseband signal processing chip 130 by an interruption manner. The baseband signal processing chip 130 compares the touch area with a threshold area that is preset, and then performs a corresponding operation on the application according to the result obtained through the comparison.

As can be known from the above descriptions, the process of determining a point touch by the action-sensing chip 110 is as follows: when the finger touches the touch screen, the action-sensing chip 110 detects a capacitance change at the touch point, and then calculates coordinates of the position touched by the finger according to the capacitance change; and when a plurality of fingers touch the touch screen, the action-sensing chip 110 detects capacitance changes at the plurality of touch points, and then calculates coordinates of the positions touched by the fingers according to the capacitance changes.

The process of determining a static action by the action-sensing chip 110 is as follows: when the touch screen is covered by a palm, the action-sensing chip 110 detects the numbers of the sensing channels covered by the palm on the X-axis and the Y-axis respectively and then calculates the area covered by the palm according to the numbers of the sensing channels covered by the palm on the X-axis and the Y-axis respectively. It should be noted that, when the touch screen is covered by the palm, the covered sensing channels that are detected by the action-sensing chip 110 are consecutive; and when the touch screen is touched by one or more fingers, the sensing channels that are detected are inconsecutive.

According to the above principles, the static action and the point touch are two different kinds of touch events that are detected by the action-sensing chip 110.

It should be understood that, in the embodiment according to the present disclosure, the described implementations of the mobile terminal are merely illustrative; and the division of the described chips is merely a division of logical functions, and the chips may be divided in other manners in real practice. For example, a plurality of chips may be combined or may be integrated into another system, or some features thereof may be omitted or not executed. Additionally, the coupling or communication connections between the chips may be achieved through some interfaces, and may also be achieved in an electrical form or in other forms.

As the components of an intelligent terminal, the function chips described above may be or may not be physical boxes, may be co-located at a same position or may be distributed among a plurality of network units, and may be achieved either in a hardware form or in a form of software function boxes. A part of or all of the modules may be selected depending on the practical needs to achieve the purpose of the present disclosure.

Figure 3:
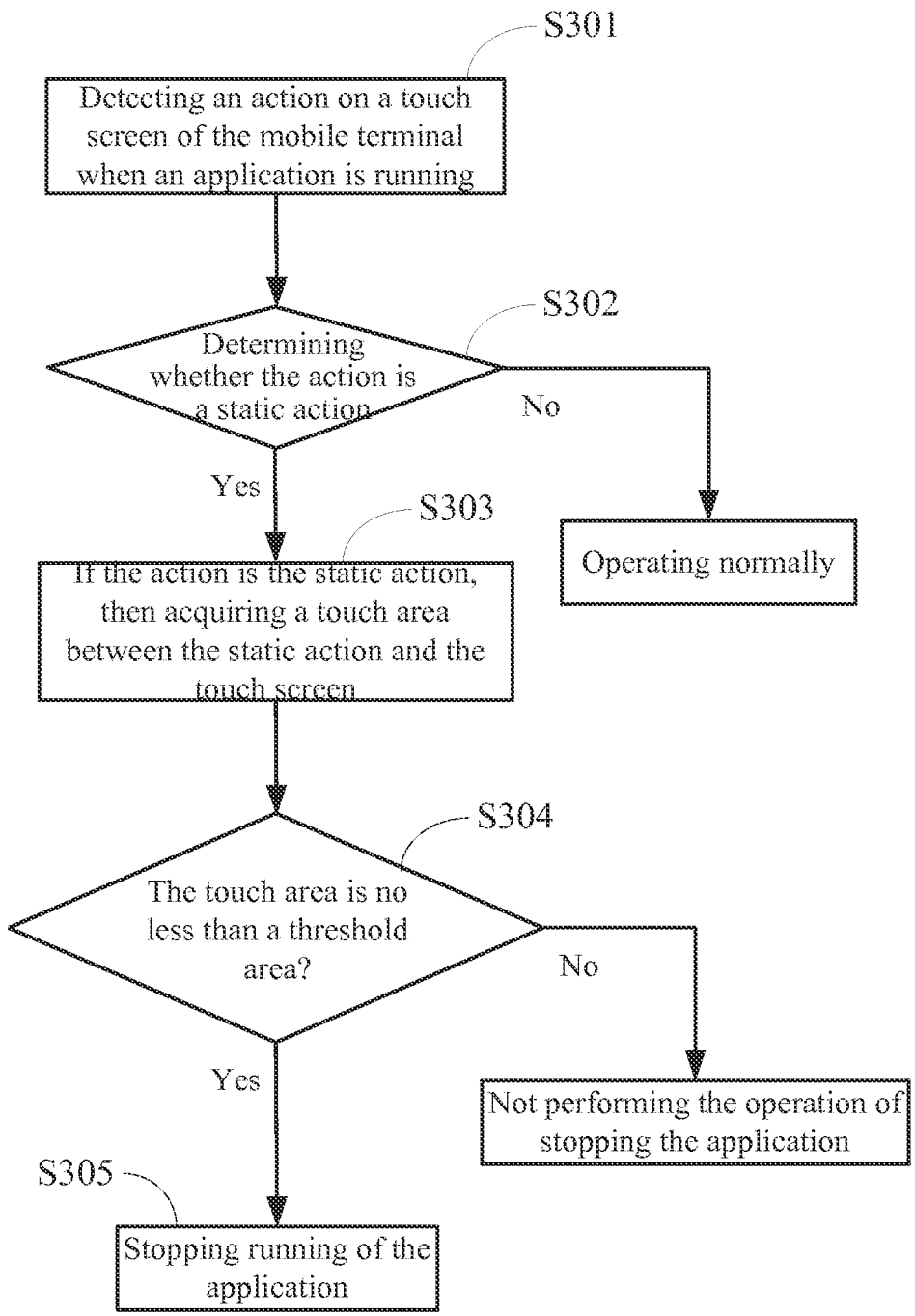
FIG. 3 is a flowchart diagram of an embodiment of an application-controlling method for a mobile terminal according to the present disclosure.

FIG. 3 is a flowchart diagram of an embodiment of an application-controlling method for a mobile terminal according to the present disclosure. As shown in FIG. 3, the controlling method of this embodiment comprises following steps.

Step S301: detecting an action on a touch screen of the mobile terminal when an application is running.

In this embodiment, the mobile terminal is a mobile phone, a tablet computer or some other mobile terminal equipped with a touch screen. After the user activates a certain application of the mobile terminal, such as, music playing, mobile phone calling or website browsing, an action sensing module begins to work, and detect an action on the touch screen of the mobile terminal in real time.

Step S302: determining whether the action is a static action.

After the action is detected by the touch screen, the action sensing module then determines the action according to the aforesaid operation principles of detecting a point touch and a static action. If it is determined that the action is not the static action, then the mobile terminal operates normally according to a controlling instruction generated in response to the point touch. If it is determined that the action is the static action, then step S303 is executed.

Step S303: if the action is the static action, then acquiring a touch area between the static action and the touch screen.

If the action sensing module determines that the action is the static action, then an action conversion module determines the current touch area of this static action according to the numbers of the consecutive sensing channels covered on the X-axis and the Y-axis of the touch screen that are detected.

Step S304: comparing the touch area with a threshold area.

If the touch area is smaller than the threshold area, then the mobile terminal determines that the static action is invalid, and will not perform the operation of stopping the application. In other embodiments, the mobile terminal may prompt the user to perform a next action again.

Step S305: if the touch area is no less than the threshold area, then stopping running of the application.

If the touch area is larger than or equal to the standard touch area, then the mobile terminal determines that the static action is valid, and performs an operation on the application, such as stopping the music playing, answering or hanging up the phone, ending the call, stopping the website browsing and etc.

Hereinbelow, a specific process of stopping the music playing will be detailed with reference to the method shown in FIG. 3.

During the music playing process, no matter which application interface the user is currently in, the mobile terminal detects in real time any touch on the surface of the touch screen. When it is detected that the touch screen is covered by a palm or some other part of the user, the mobile terminal determines whether the covering action is a static surface touch action according to the aforesaid controlling method. If the covering action is a static action, the mobile terminal determines whether the touch area between the covering action and the touch screen is larger than a threshold area that is preset. If the touch area is larger than the threshold area, then the mobile terminal stops the music playing. Preferably, in this embodiment, the mobile terminal firstly pauses the music playing, and records information of the current music playing, and then deactivates the application of music playing.

According to the above descriptions, the present disclosure senses a static action of a user on a touch screen of a mobile terminal, acquires a touch area of the static action, and then compares the touch area with a threshold area so as to control the mobile terminal to achieve operations on applications such as turning off a music player, closing a web browser, hanging up the phone and etc. The mobile terminal and the application-controlling method thereof according to the present disclosure make it more convenient for the user to operate the applications of the mobile terminal, and are easy to operate and to be popularized.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the protection scope of the present disclosure.

What is claimed is:

1. An application-controlling method for a mobile terminal, comprising:
    detecting an action on a touch screen of the mobile terminal when an application is running, wherein the application is a music playing application;
    if the action is a static action, then acquiring a touch area between the static action and the touch screen, wherein numbers of sensing channels covered by the static action on an X-axis and a Y-axis of the touch screen respectively are detected, and the touch area of the static action is determined according to the numbers of the sensing channels, and wherein the sensing channels covered by the static action on the X-axis and the Y-axis of the touch screen are consecutive, and the static action is a static covering on the touch screen by a palm or a touch on the touch screen by a face; and
    comparing the touch area with a threshold area, and if the touch area is no less than the threshold area, thus pausing the music playing application, and recording information of a currently-playing music of the music playing application, and then deactivating the music playing application;

wherein the acquired touch area is reported in an interruption manner by a touch screen chip of the touch screen to a baseband signal processing chip, and then the baseband signal processing chip compares the touch area with the threshold area.

2. The method of claim 1, wherein if the action is not a static action, the mobile terminal operates normally according to a controlling instruction generated in response to a point touch.

3. The method of claim 1, wherein the action of the touch screen of the mobile terminal is detected in real time by an action sensing module, and the action sensing module begins to work after activating the music playing application to detect the action of the touch screen in real time.

4. A mobile terminal, comprising an action-sensing chip, a touch screen and a baseband signal processing chip, the action-sensing chip being coupled with the baseband signal processing chip, the touch screen being coupled with the baseband signal processing chip, and an application runs in the baseband signal processing chip, wherein:

the action-sensing chip detects an action on the touch screen when the application is running, wherein the application is a music playing application;

if the action-sensing chip determines that the action is a static action, then the touch screen acquires a touch area between the static action and the touch screen, wherein the touch screen is provided with a touch screen chip, which is configured to detect numbers of sensing channels covered by the static action on an X-axis and a Y-axis of the touch screen respectively and to determine the touch area of the static action according to the numbers of the sensing channels, and wherein the sensing channels covered by the static action on the X-axis and the Y-axis of the touch screen that are detected by the touch screen chip are consecutive, and the static action is a static covering on the touch screen by a palm or a touch on the touch screen by a face; and the baseband signal processing chip acquires the touch area from the touch screen, compares the touch area with a threshold area, and if the touch area is no less than the threshold area, thus pauses the music playing application, and recording information of a currently-playing music of the music playing application, and then deactivating the music playing application;

wherein the acquired touch area is reported in an interruption manner by the touch screen chip of the touch screen to the baseband signal processing chip, and then the baseband signal processing chip compares the touch area with the threshold area.

5. The mobile terminal of claim 4, wherein if the action-sensing chip determines that the action is not a static action, the mobile terminal operates normally according to a controlling instruction generated in response to a point touch.

* * * * *